Aug. 10, 1965 W. KOBER 3,200,276
TEMPERATURE COMPENSATING MOUNTING FOR DYNAMOS
Filed March 13, 1962
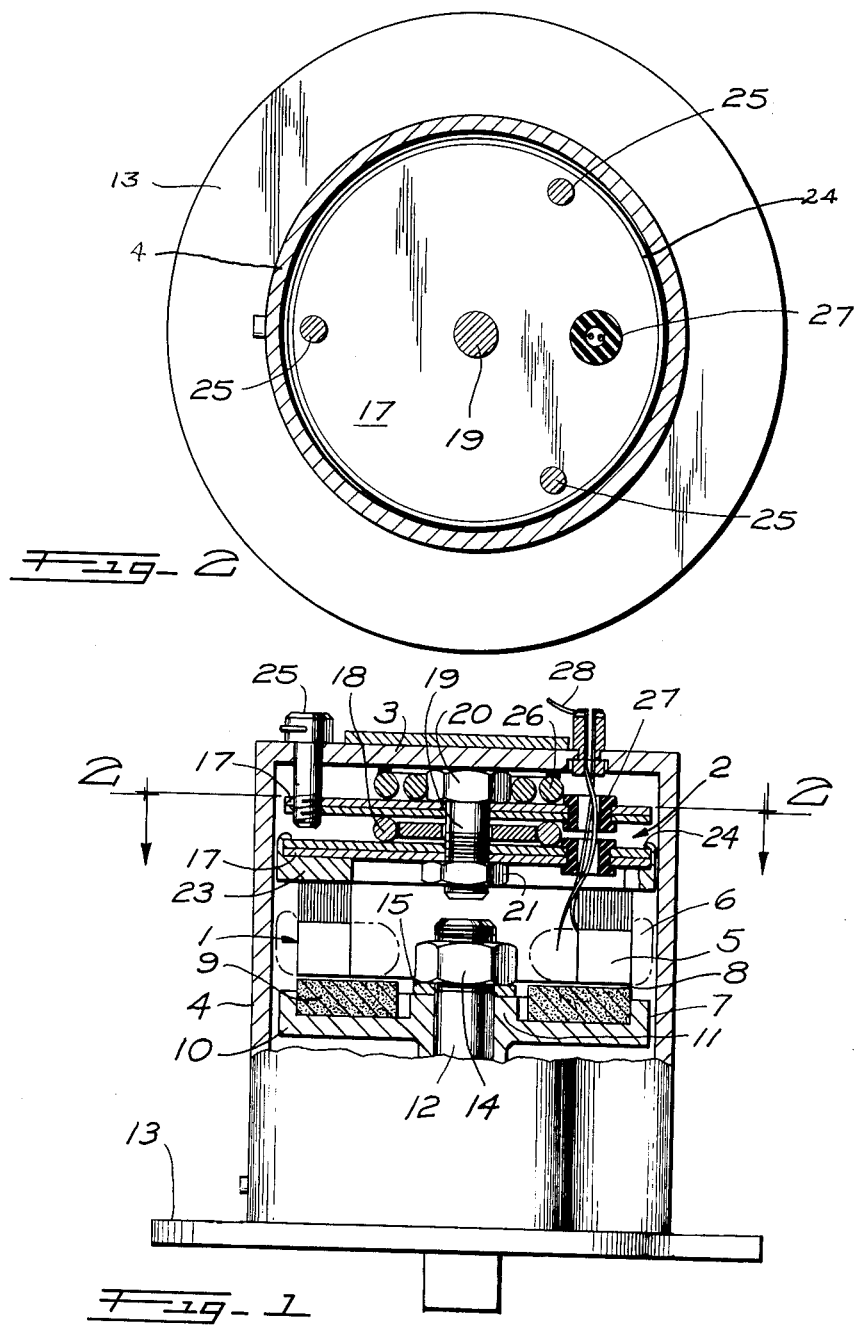
INVENTOR.
WILLIAM KOBER
BY
Christel & Bean
ATTORNEYS 3,200,276
TEMPERATURE COMPENSATING MOUNTING
FOR DYNAMOS
William Kober, Fairport, N.Y., assignor, by mesne assignments, to The Garrett Corporation, Los Angeles, Calif., a corporation of California
Filed Mar. 13, 1962, Ser. No. 179,424
6 Claims. (Cl. 310—191)

This invention relates to a new and useful temperature compensating assembly particularly adapted for mounting a dynamo rotor or stator for movement lengthwise of the axis of rotor rotation.

Variations in temperature produce variations in the magnetic field of a dynamo. In a permanent magnet generator, for example, the magnet material will suffer a loss of flux, with consequent reduction in output voltage, upon an increase in temperature. Temperature changes are largely unavoidable, as a practical matter, because they naturally follow variations in the temperature of the ambient atmosphere, from warming up the dynamo, and other factors. Therefore, it is desired to compensate for such loss of flux, and voltage drop, upon a change in temperature.

In dynamos of the axial air gap type, such loss of flux can be compensated for by varying the length of the air gap, and this can be accomplished by shifting either the rotor or the stator along the axis of rotor rotation.

Such shifting can be produced by a bimetal device, but if a large motion is desired a problem arises in maintaining parallelism between the rotor and stator faces. Such parallelism is essential, to proper operation, and conventional bimetal structures are too flexible to resist many of the external forces of deformation, normally encountered and tending to produce non-parallelism between the working faces.

Accordingly, the primary object of my invention is to provide a bimetallic, temperature compensating mounting assembly, for dynamos, producing a large, parallel motion while possessing a high degree of stiffness for resisting external load forces tending to produce non-parallelism.

A temperature compensating assembly constructed in accordance with my invention is characterized, in one aspect thereof, by the provision of a bimetallic beam having support means engaging the beam generally centrally thereof, for thermal deflection of the outer end portions of the beam lengthwise of the axis of rotor rotation, a dynamo part, such as rotor or stator, connected to the beam end portions for movement therewith lengthwise of the axis, and fulcrum means bearing against the beam at points spaced between the center thereof and the outer end portion, the support means holding the beam against the fulcrum means during such thermal deflection.

In another aspect thereof, a temperature compensating assembly of my invention is characterized by the provision of a pair of bimetallic disks arranged for thermal deflection in opposite directions relative to each other, lengthwise of the axis of rotor rotation, a ring concentric with the disks and interposed therebetween, means holding the disks against the ring during thermal deflection of the disks, and support means connected to one of the disks adjacent the periphery thereof, the other disk being connected adjacent its periphery to either the stator or the rotor of the dynamo, for moving the same along the axis of rotor rotation upon thermal deflection of the disks.

The foregoing and other objects, advantages and characterizing features of my invention will become clearly apparent from the ensuing detailed description of a presently preferred embodiment thereof, considered in conjunction with the accompanying drawing showing the same wherein like reference numerals denote like parts throughout and wherein:

FIG. 1 is a view, partly in longitudinal section and partly in elevation, of a dynamo the armature of which is mounted by a temperature compensating assembly of my invention; and FIG. 2 is a transverse sectional view thereof, taken about on line 2—2 of FIG. 1.

Referring now in detail to the illustrative embodiment depicted in the accompanying drawing, there is shown a stator armature 1 mounted by a temperature compensating assembly 2 of my invention on an end wall 3 of an enclosing housing 4. Armature 1 comprises laminated iron, mounted on a plate 23 and formed with teeth 5 containing windings 6 and having its working face spaced apart from the working face of a rotor field 7 across an axial air gap 8.

Rotor 7 comprises an annular, ceramic permanent magnet 9 carried by a body 10 having a hub 11 mounted on shaft 12. Shaft 12 is journalled for rotation about its axis by any suitable means such as the bearing cup described in my pending application Serial No. 156,455, filed December 1, 1961, and extends through end wall 13 for attachment to a suitable drive, not shown. Rotor 7 is held in place by a nut 14 threaded on the end of shaft 12 against washer 15.

The temperature compensating mounting assembly 2 comprises a pair of bimetal disks 17 which can be identical, and which are arranged in opposition for deflection in opposite directions relative to each other lengthwise of the axis of shaft 12, which is the axis of rotor rotation. In other words, disks 17 are centered on the axis of shaft 12, with the high expansion portion on one side of the low expansion portion in one disk and on the opposite side of the low expansion portion in the other disk. Disks 17 are spaced apart by a ring 18 concentric therewith and positioned therebetween, the ring having a radius substantially less than that of the disks, and bearing against the disks in the manner of a fulcrum intermediate the center of the disks and the peripheries thereof. A bolt 19 passes through the apertured centers of disks 17 and tightly clamps the same against ring 18, having a head 20 bearing against one disk 17 and carrying a nut 21 bearing against the other disk. The ring 18 can comprise an annular flange of enlarged, circular cross section, around the periphery of a thin web or plate 22 which also is centrally apertured to receive bolt 19.

One of disks 17 is connected to the armature mounting plate 23 which has a peripheral flange 24 extending around the peripheral edge of the disk and therebehind. The other disk 17 is secured to the housing end wall 3 by three or more bolts 25 engaging the disk at spaced points around its periphery and holding it against the action of a spring 26. Disks 17 are additionally apertured to receive grommets 27 of insulating material, through which the leads 28 of armature windings 6 can pass.

When initially assembling the dynamo, the axial length of air gap 8 is determined by bolts 25, with spring 26 maintaining a tight assembly. Thereafter, as the ambient temperature rises the disks 17 are deflected in opposite directions lengthwise of the shaft axis. In the arrangement shown, the high expansion sides of disks 17 are located adjacent each other, whereby their peripheral portions move away from each other to reduce the length of air gap 8 upon a rise in temperature, and thereby compensate for loss of flux in the magnet material.

The one disk 17 has its peripheral portion fixed relative to end wall 3. Consequently, its central portion is deflected away from end wall 3 and toward the other disk 17 upon an increase in temperature. The other disk 17, being centrally mounted on the one disk, is axially displaced by such deflection thereof. Further, the peripheral portion of the stator connected disk is deflected toward rotor 7 upon an increase in temperature, whereby the two disks cooperate in shifting armature 1 along the axis. Of course, the air gap length could be increased upon an increase in temperature, in which event the relative position of disks 17 would be reversed.

A large motion is obtained, together with a high degree of stiffness and resistance to external deformation forces tending to produce non-parallelism, because the effect of bimetal temperature-produced motion is emphasized while the effect of bimetal elastic deformation by external load forces is deemphasized. Thus, considering each disk 17 as a spherical surface changing its radius with temperature, the deflection $x$ at any point a distance P from the center of the disk is approximated by the equation $$x = tKP^2$$

where $t$ is the change in temperature and $K$ is the temperature coefficient of the bimetallic disk 17. Therefore, if ring 18 has a radius P equal to ½ the radius R of disk 17, the deflection of disk 17 at the point P normally would be ¼ the deflection at R. However, disk 17 is held against ring 18, whereby the total deflection at R, the periphery of the disk, is reduced by ¼ to ¾ the deflection which would result if the disks 17 were clamped together only at their centers.

This decrease in motion, by a factor of ¼, is more than offset by the resulting increase in stiffness. This is because disk 17, bearing against ring 18, has its bending section, comprising its radius, reduced by a factor of ½. In other words, external bending forces, applied to the periphery of disk 17, acts on a beam section only ½ the length of the total distance from the center of the disk to its perimeter, because of the fulcrum ring 18. This reduction in beam length by ½, would result in a rectangular beam in 4 times as much beam stiffness than if the disks were clamped together only at their centers. In this spherical beam, the gain in stiffness is even greater.

Therefore, it is seen that with the illustrated arrangement, assuming a ring diameter ½ the disk diameter, the thermal deflection, comprising the desired parallel or axial motion, is decreased by only ¼, while the stiffness of the assembly is increased by a factor of 4. With only a relatively small reduction in motion produced, a significant increase in resistance to non-parallel, deforming forces is produced, whereby the movable part of the dynamo, whether it be rotor, stator or some other part, can be properly supported using bimetallic elements.

In addition, in the preferred form of the invention the beam is circular, as illustrated. This provides a much greater effective beam width, than is the case with a non-circular beam, resulting in an even greater stiffness and ability to produce deformation-resisting force at the disk perimeters. Note that the armature mounting plate 23 has its flange 24 gripping the adjacent disk 17 completely around the periphery thereof.

In the illustrated embodiment, bolt 19 and its nut 21 are tightened to clamp disks 17 together, against ring 18, and thereby spring load the disks completely throughout the contemplated thermal deflection range thereof. This spring loading of the disks exceeds the temperature deformation thereof, over the expected range, thereby maintaining the disks tightly engaged against ring 18 throughout the contemplated temperature range. If sufficient elasticity is not available through such bending of disks 17 by bolt 19 and nut 21, a spring can be placed between the bolt head 20 and adjacent disk 17, or between nut 21 and disk 17 adjacent thereto, to provide the necessary additional springing action.

Therefore, the disks are stressed, centrally thereof, and it will be appreciated that those portions of the disks which are of smaller diameter than ring 18 do not contribute to force deformation, but they do contribute to thermal motion since they slope the disks at the ring 18, and this leads to thermal deformation at the periphery.

Accordingly, it is seen that my invention fully accomplishes its intended objects. While I have disclosed and described in detail only one specific embodiment of my invention, that has been done by way of illustration only and without thought of limitation.

Having fully disclosed and completely described my invention, and its mode of operation, what I claim as new is:

1. In a dynamo having a stator structure and a rotor structure mounted for rotation about an axis relative to said stator structure, a temperature compensating assembly mounting one of said structures for movement relative to the other thereof along said axis comprising, a bimetallic beam, support means engaging said beam generally centrally thereof for thermal deflection of the outer end portions of said beam lengthwise of said axis, said one structure being connected to said beam outer end portions for movement therewith lengthwise of said axis, and fulcrum means bearing against said beam intermediate the center thereof and said outer end portions, said support means during thermal deflection of said beam holding said beam against said fulcrum means.

2. The combination set forth in claim 1, wherein said beam comprises a disk.

3. In a dynamo having a stator structure, and a rotor structure mounted for rotation about an axis relative to said stator structure, a temperature compensating assembly mounting one of said structures for movement relative to the other thereof along said axis comprising, a bimetallic disk arranged for thermal deflection through a predetermined range lengthwise of said axis, a ring concentric with said disk and of substantially lesser diameter than said disk, and means holding said disk against said ring throughout said thermal deflection range, said one structure being connected to said disk adjacent the periphery thereof.

4. In a dynamo having a stator structure, and a rotor structure mounted for rotation relative to said stator structure about an axis, a temperature compensating assembly mounting one of said structures for movement relative to the other thereof along said axis comprising, a pair of bimetallic disks arranged for thermal deflection in opposite directions relative to each other lengthwise of said axis, a ring concentric with said disks and interposed therebetween, means holding said disks against said ring during normal deflection of said disks, said ring bearing against said disks intermediate the centers and the peripheries thereof, and support means connected to one of said disks, the other of said disks being connected to said one structure for moving the same along said axis relative to said other structure upon thermal deflection of said disks.

5. The combination set forth in claim 4, wherein said support means and said one structure are connected to said disks adjacent the periphery thereof, said means holding said disks against said rings comprising clamping means engaging said disks centrally thereof.

6. In a dynamo having a part movable through a path, a temperature compensating assembly mounting said part for movement along said path comprising, a pair of bimetallic disks arranged for thermal deflection in the direction of said path and in opposite directions relative to each other, a ring concentric with said disks and interposed therebetween in concentric relation thereto, said ring being of substantially lesser diameter than said disks, clamping means engaging said disks centrally thereof and thereby spring loading said disks for holding the same against said ring throughout the thermal deflection of said disks over the contemplated temperature range, and support means connected to one of said disks adjacent the periphery thereof, said dynamo part being connected to the other of said disks adjacent its periphery.

References Cited by the Examiner

UNITED STATES PATENTS 2,720,604  8/56  Mitchel et al. _____ 310—97
2,761,080  10/57 Akeley _____ 310—97

MILTON O. HIRSHFIELD, *Primary Examiner.*

UNITED STATES PATENT OFFICE
CERTIFICATE OF CORRECTION

Patent No. 3,200,276                 August 10, 1965

William Kober

It is hereby certified that error appears in the above numbered patent requiring correction and that the said Letters Patent should read as corrected below.

Column 2, line 47, for "center" read -- centers --; column 4, line 61, for "normal" read -- thermal --.

Signed and sealed this 8th day of February 1966.

(SEAL)
Attest:

ERNEST W. SWIDER

Attesting Officer

EDWARD J. BRENNER

Commissioner of Patents